United States Patent
McDermott et al.

(10) Patent No.: US 9,577,856 B1
(45) Date of Patent: Feb. 21, 2017

(54) FREQUENCY COMPENSATION TECHNIQUES AND SYSTEMS

(71) Applicant: Higher Ground LLC, Palo Alto, CA (US)

(72) Inventors: Scott McDermott, Washington, DC (US); David Ziers, Montebello, CA (US)

(73) Assignee: Higher Ground LLC, Palo Alto, CA (US)

( * ) Notice: Subject to any disclaimer, the term of this patent is extended or adjusted under 35 U.S.C. 154(b) by 0 days.

(21) Appl. No.: 14/826,523

(22) Filed: Aug. 14, 2015

(51) Int. Cl.
*H04L 27/26* (2006.01)
*H04L 27/00* (2006.01)
*H04B 7/01* (2006.01)

(52) U.S. Cl.
CPC ....... *H04L 27/0006* (2013.01); *H04L 27/2613* (2013.01); *H04B 7/01* (2013.01); *H04L 27/266* (2013.01); *H04L 27/2659* (2013.01); *H04L 27/2675* (2013.01)

(58) Field of Classification Search
CPC ...... H04B 7/01; H04L 27/2659; H04L 27/266; H04L 27/2675
See application file for complete search history.

(56) References Cited

U.S. PATENT DOCUMENTS

| | | | |
|---|---|---|---|
| 5,020,131 A | 5/1991 | Isoe | |
| 5,036,523 A | 7/1991 | Briskman | |
| 5,390,348 A | 2/1995 | Magin et al. | |
| 6,356,740 B1 * | 3/2002 | Malcolm | H03J 7/02 455/12.1 |
| 2007/0098089 A1 | 5/2007 | Li et al. | |
| 2008/0310566 A1 * | 12/2008 | Tsuruta | H04L 27/0014 375/350 |
| 2011/0211489 A1 | 9/2011 | Chung et al. | |
| 2012/0069794 A1 | 3/2012 | Kim et al. | |
| 2013/0149974 A1 * | 6/2013 | Lorenz | H04W 4/02 455/75 |
| 2014/0370823 A1 | 12/2014 | Yu | |

OTHER PUBLICATIONS

Office Action issued Jul. 27, 2016 in U.S. Appl. No. 14/826,727, by McDermott.
Int'l Search Report and Written Opinion issued Sep. 15, 2016 in Int'l Application No. PCT/US16/46584.

* cited by examiner

*Primary Examiner* — Ross Varndell
(74) *Attorney, Agent, or Firm* — Panitch Schwarze Belisario & Nadel (57) ABSTRACT

Techniques for compensating for frequency offset of a frequency used in a translation of a signal from a first band to a second band may include using a frequency reference signal located in a different band from an information-bearing signal, where the different band may be a guard band. The frequency reference signal may be offset from a particular frequency, which may be a center frequency, of the information-bearing signal by a known amount. The frequency reference signal may be received by the transmitting station, a frequency offset may be derived, and the frequency offset may be used to pre-compensate further transmitted signals. At another station, the received frequency reference signal may be used to lock a local oscillator for demodulation and/or transmission of the information-bearing signal based on the known offset of the frequency reference signal from the frequency of the information-bearing signal.

27 Claims, 9 Drawing Sheets

FREQUENCY COMPENSATION TECHNIQUES AND SYSTEMS

FIELD OF ENDEAVOR

Aspects of the present disclosure may relate to techniques for frequency coordination and acquisition in a communication system.

BACKGROUND

One issue that may arise, particularly in wireless communication systems, is that of frequency coordination and acquisition. This may be of particular concern in a device that needs to be small, low-power and low-cost, such as in many of today's mobile wireless communication systems. A low-cost, low-bandwidth receiver may need to search over many kilohertz (kHz) of bandwidth to locate a transmission to be received because the receiver's local oscillator (LO) may be even only a few parts-per-million (ppm) off from the transmitter's LO frequency. Combined with temporal ambiguities and/or waveform designs that may push the transmission down toward and below the channel noise in order to meet power spectral density (PSD) limits, the receiver's initial acquisition task may become gargantuan.

For example, a device may be required to be able to acquire an incoming signal with a frequency offset of up to +8 kHz (e.g., 2 ppm oscillator offset at up to 4 GHz). Such a device must, therefore, search within a 16 kHz space for its incoming signal. For practical reasons, the device may need to do this in a short enough amount of time that it is not onerous to the user, who may, for example, be standing in place, aiming the device and waiting for it to acquire a signal.

The most efficient mechanism for achieving frequency alignment is to provide a consistent, precise frequency reference—a pilot tone. There are other mechanisms (e.g., chirps, phase-loop tracking of a phase-variant signal, use of a common reference, etc.), but ultimately they all require more resources, meaning ultimately, more time. Therefore, one would ideally like to have a tone-based frequency acquisition that may acquire frequency in a reasonably short amount of time.

SUMMARY OF THE DISCLOSURE

Various aspects of the disclosure may be directed to pilot signal-based frequency acquisition techniques. In some aspects, the pilot signal may be a single-frequency tone, several such tones, or other narrowband signal. The pilot signal may be transmitted in a guard band. Guard bands are areas of allocated spectrum between frequency bands that are nominally used for communications traffic (or other radio-frequency (RF) transmission traffic, such as, but not limited to, radar, telemetry, etc.). Guard bands typically may not be used for communication traffic, due to, e.g., filter distortions. The use of guard bands for transmitting a pilot signal may allow the pilot signal to be transmitted using a higher power than if it were transmitted in a band typically used for communications traffic.

According to some aspects of this disclosure, the overall system may include a first station, which may be a satellite ground station that may transmit an uplink signal; a satellite transponder or other type of frequency translating repeating system that may receive the uplink signal, translate it in frequency, and retransmit it on a downlink, and which may have substantially omni-directional or sufficiently wide coverage in the downlink direction, such that the first station is able to receive the downlink signal; and a second station that may receive the downlink signal. The uplink signal may include the pilot signal, as well as an information-bearing signal, and the downlink signal may include frequency-translated versions of the pilot signal and the information-bearing signal. The first station may compensate the uplink signal for frequency variations/offsets in an oscillator used in the frequency translation. The second station may compensate its local oscillator based on the pilot signal of the downlink signal.

Various operations may be performed by dedicated electronic hardware devices, or alternatively, may be implemented using other hardware, software, or firmware, or combinations thereof, including the possibility of using a processor that may execute software instructions, which may, e.g., be saved on a storage device, and which may cause the operations to be implemented.

BRIEF DESCRIPTION OF ACCOMPANYING DRAWINGS

Various aspects of this disclosure will now be discussed in further detail in conjunction with the attached drawings, in which.

DETAILED DESCRIPTION OF ASPECTS OF THE DISCLOSURE

Figure 1:
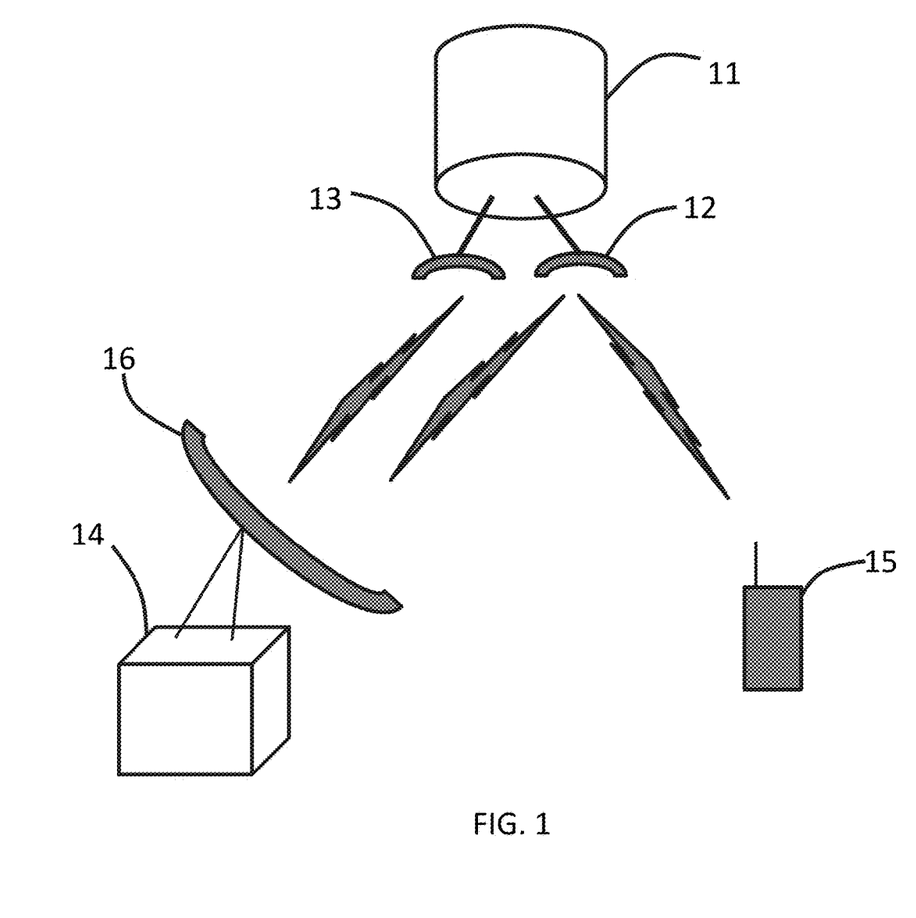
FIG. 1 shows an example of a conceptual diagram of a system according to various aspects of the disclosure.

FIG. 1 shows a conceptual example of system according to various aspects of this disclosure. In FIG. 1, a satellite 11 may have at least two antennas 12, 13; however, it may have only one antenna (or array), according to another aspect of the disclosure. In one aspect, satellite 11 may be a geosynchronous satellite and may contain a transponder, discussed below. The system may include one or more ground stations 14, which may have one or more antennas 16, which may facilitate communications with the satellite 11. The satellite 11 may also communicate with other stations 15, which may, e.g., be small and/or hand-held devices.

Ground station 14 may transmit an uplink signal to antenna 13 of satellite 11. Within satellite 11, the received uplink signal may be translated to another frequency and re-transmitted via antenna 12 as a downlink signal (in some cases, however, a single antenna/array may be used for both the uplink and the downlink). The downlink signal may be received at both device 15 and ground station 14.

It is noted that, according to other aspects of this disclosure, block 11 need not be a satellite. Rather, it may be any repeater that translates an uplink signal in a first frequency band to a downlink signal of a second frequency band, where the downlink signal may be received by both the station transmitting the uplink signal 14 (which need not be a satellite ground station) and by other stations 15. For example, block 11 may, alternatively, represent a radio frequency (RF) repeater that has an uplink in one frequency band and a downlink on a different frequency band, and which re-transmits on the downlink either omni-directionally or such that the uplink transmitting station is capable of also receiving the downlink signal (for example, but not limited to the cases in which the uplink and downlink antennas provide overlapping coverage areas or are the same antenna).

Figure 2:
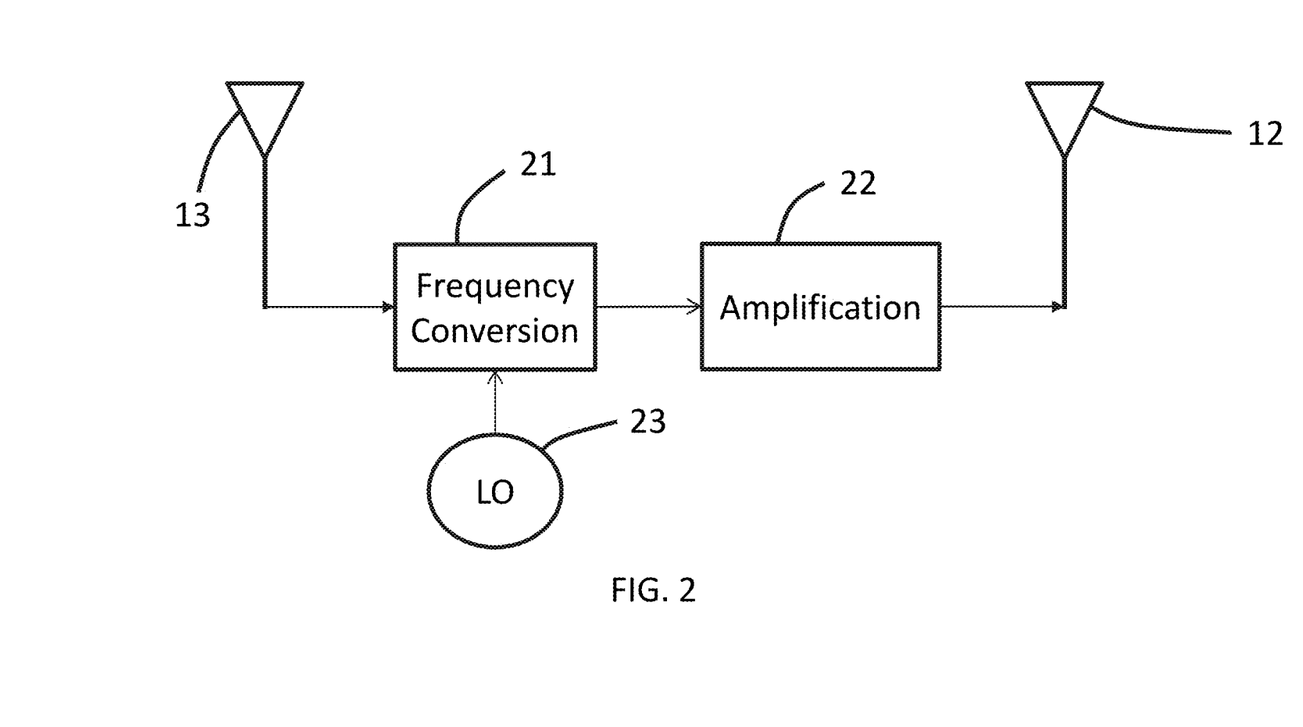
FIG. 2 shows an example of a conceptual block diagram of a transponder/frequency translation system, according to various aspects of the disclosure.

FIG. 2 shows a conceptual block diagram of an example of a transponder of satellite 11 or, alternatively, of a frequency-translating signal repeating system. An uplink signal may be received via an antenna 13. The received signal may undergo various operations, not shown, such as filtering and/or amplification. The signal may be fed into a frequency conversion block 21, which may have a second input from a local oscillator (LO) 23. The frequency conversion block 21 may use the input signal from LO 23 to translate a frequency band of the uplink signal. For example, to which the invention is not limited, the frequency conversion block 21 may multiply the uplink signal by a LO 23 signal set to a frequency such that one of the resulting frequency-sum and frequency-difference bands obtained by this multiplication may lie substantially in a desired frequency band for the downlink, and the unwanted signal band (frequency-difference or frequency-sum, respectively) may be filtered out. The result may then be amplified 22 and transmitted on the downlink antenna 12 (again, it is noted that the uplink and downlink antennas may, according to an aspect of this disclosure, be a single antenna/array).

An issue in such a system, as shown in FIG. 2, is that the frequency of LO 23 may not be accurate. It may be initially off, e.g., by some slight amount, it may drift as components age or temperatures vary, etc. Therefore, the downlink signal may not actually end exactly at the intended downlink frequency. This may contribute to the frequency acquisition task of a small, low-cost, low-bandwidth station, as discussed above.

Figure 3:
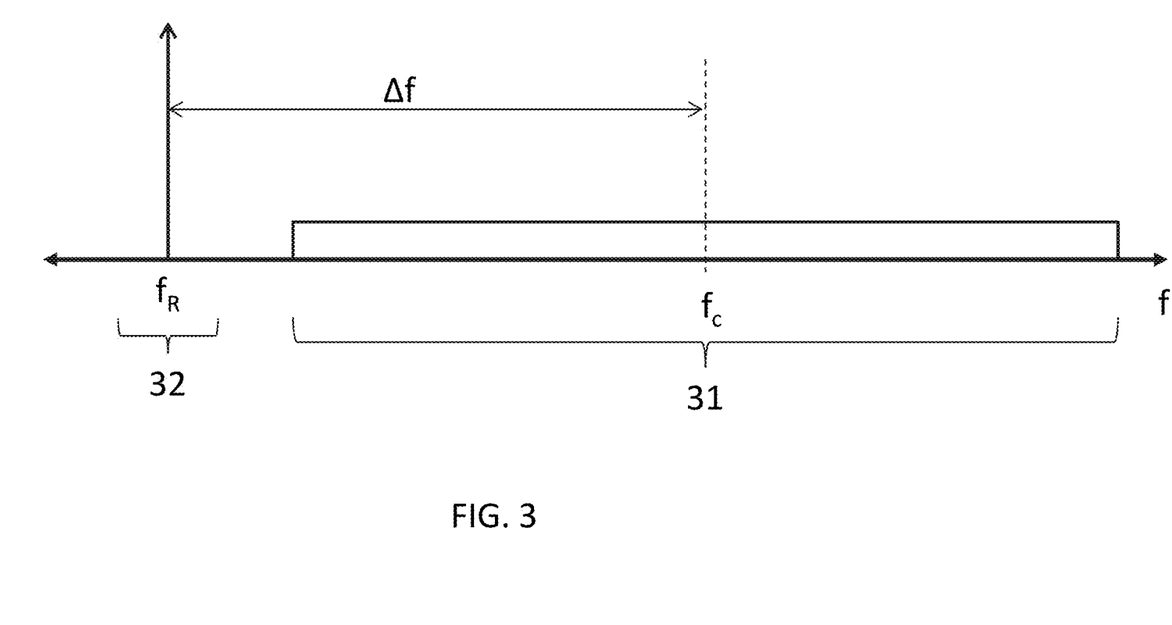
FIG. 3 shows a conceptual example of a frequency spectrum, according to an aspect of the disclosure.

FIG. 3 shows an example of a frequency spectrum, not necessarily complete or to scale, that may be used according to various aspects of this disclosure. In particular, FIG. 3 shows an information-bearing signal 31, shown centered at a frequency $f_c$, and a pilot signal 32, shown at a frequency $f_R$. The difference between $f_c$ and $f_R$ is shown as $\Delta f$; $\Delta f$ may be a fixed quantity known to all stations 14, 15. Pilot signal 32 may, in some cases, be a single-frequency tone, i.e., a pilot tone, of frequency $f_R$; hereinafter, the pilot signal 32 may be referred to as a "pilot tone" or as a "frequency reference signal," with the understanding that it may be a single tone but is not thus limited.

It is further noted that $\Delta f$ need not be a difference between the pilot tone 32 and the center frequency $f_c$. In general, $\Delta f$ may be a difference between the pilot tone 32 and any predefined frequency of the information-bearing signal 31. In general, the center frequency may be convenient, but this is not a requirement, and the invention is not thus limited (as a further non-limiting example, $\Delta f$ may be a difference between the pilot tone 32 and an edge frequency of the band containing the information-bearing signal).

Information-bearing signal 31 may be required, e.g., by a regulatory body, to maintain a signal power spectral density below a particular level. In such a case, although one may wish to transmit a pilot tone within the band of the information-bearing signal 31, this may result in a violation of regulations. One solution, according to an aspect of this disclosure, may be to transmit the pilot tone 32 in an unused region of the frequency spectrum ("unused" in the sense that the region of the frequency band is nominally not used for signaling), e.g., in a guard band between nominally allocated portions of spectrum. While such a band may be noisy or otherwise ill-suited to data communications, it may also permit transmission of pilot tone 31 at a level sufficiently high to use it for frequency acquisition and above the noise level of the guard band. Although shown as being transmitted in a guard band adjacent to the band in which the information-bearing signal 31 is transmitted, the invention is not thus limited, and pilot tone 32 may be transmitted in a non-adjacent guard band, or in any other unused or unregulated band; this may merely increase the value of $\Delta f$.

As discussed above, the quantity $\Delta f$ may be known to all stations 14, 15. $\Delta f$ may represent an offset between, e.g., a center frequency $f_c$ of the transmitted information-bearing signal 31 and a frequency $f_R$ of pilot tone 32. If $\Delta f$ is known, and if a receiver is able to locate the pilot tone 32, the receiver may then be able to locate the information-bearing signal center frequency $f_c$ by noting the offset from $f_R$.

The concept in the immediately-preceding paragraph may work very well if the receiver knows where to find $f_R$. However, if the LO 23 frequency should drift from its desired value, $f_R$ may be offset from where it is intended to be in the downlink signal and may be more difficult to acquire and/or may result in inaccuracies in frequency acquisition. Therefore, it is desirable to be able to compensate for inconsistencies in LO 23 frequency.

In some systems, compensation for frequency drift in LO 23 may be able to be automatically compensated at LO 23; however, in many systems, including many simple satellite transponders, this may not be possible. Therefore, according to an aspect of this disclosure, a station 14 may "pre-compensate" for frequency drift at LO 23, e.g., by adjusting one or more of its own transmission frequencies to compensate for such frequency drift.

Figure 4:
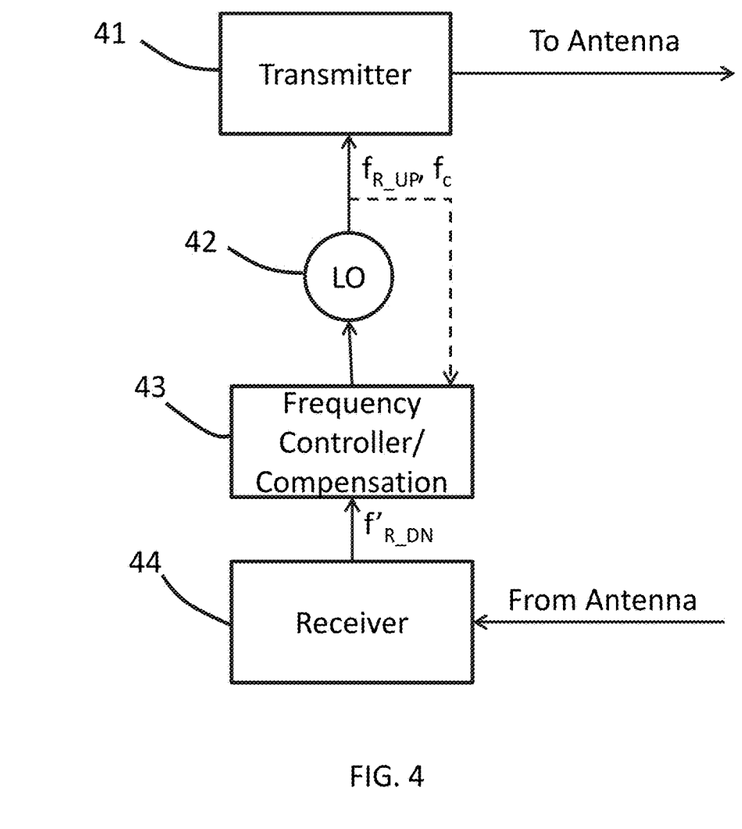
FIG. 4 shows an example of a conceptual block diagram of a portion of a system, according to an aspect of the disclosure.

In particular, station 14 may transmit a signal containing a reference signal, which may be similar to the type of signal shown and described with respect to FIG. 3. In one example implementation, the information-bearing portion 31 of the signal may be transmitted in the 5.9 GHz frequency band. The signal may be transmitted by a transmitter 41, e.g., to a transponder, e.g., as in FIG. 2, on a satellite 11 (or, again, other type of repeater/frequency translator apparatus, as discussed above), as an uplink signal. In this context, the reference signal may be at some frequency $f_{R\_UP}$, which may be supplied to transmitter 41 by a local oscillator (LO) 42. LO 42 is also shown generating the center frequency $f_c$ for information-bearing signal 31; note that, as discussed above, the value between these frequencies, $\Delta f$, may be a known constant value. It is further noted that, although LO 42 is shown as generating both frequencies, in general, there may be two separate LOs to generate these two frequencies; however, in the discussion below, one LO 42 will be discussed, and it should be understood that the same discussion may be addressing two separate LOs.

On a further note, rather than generating the center frequency, $f_c$, if the transmitter 41 uses multiple upconversion stages ("heterodyning"), LO 42 may generate one or more appropriate frequencies to use in the upconversions, such that the information-bearing signal is centered at $f_c$. Therefore, it should be understood that LO 42 may not only comprise two LOs, but it may comprise more than two LOs, and "$f_c$" may represent one or more frequencies for use in modulation and/or upconversion of the information-bearing signal. The discussion below will generally refer to "$f_c$," but it should be understood that such discussion not thus limited and, rather, is intended to cover the one or more frequencies for use in modulation and/or upconversion of the information-bearing signal.

In satellite 11, the transponder may convert the signal to another frequency band, which may, in a non-limiting example, be the 3.7 GHz frequency band, using a transponder local oscillator 23 and frequency converter 21. In the example of the 5.9 GHz-band uplink and conversion to the 3.7 GHz band, the transponder LO 23 may provide an output to frequency converter 21 at a frequency of 2.2 GHz, which may drift, e.g., by some quantity $\Delta f_T$, such that the frequency is actually at 2.2 GHz+$\Delta f_T$ (where $\Delta f_T$ may be positive or negative and need not necessarily be a constant in time). As a result, the output reference signal of the transponder, i.e., the frequency-translated version of the pilot tone 32 that was at $f_{R\_UP}$, may be located at a frequency $f_{R\_DN}$, which is offset from its expected value (i.e., the frequency at which one would expect to find it in the case of no offset) by $\pm\Delta f_T$ (i.e., depending upon which sideband resulting from frequency multiplication in frequency converter 21 is actually used as the downlink signal, the offset may be either a positive or negative offset by $\Delta f_T$, regardless of whether $\Delta f_T$ is positive or negative). Station 14 may receive the downlink signal that may also be received by station 15. At a receiver 44, station 14 may identify the reference signal and may derive $f_{R\_DN}$. Station 14 may generally be aware of an expected value of downlink reference signal frequency, $f_{R\_DN}$, assuming that $\Delta f_T$ is zero (i.e., in the case of no frequency drift in LO 23).

The value of $f_{R\_DN}$ obtained by receiver 44 may be provided to a frequency controller/compensation block 43. Frequency controller/compensator 43 may control LO 42 to compensate for frequency drift in LO 23; in some aspects of this disclosure, the uplink reference signal frequency, $f_{R\_UP}$, may be provided to frequency controller/compensator 43.

Frequency controller/compensator 43 may operate according to any appropriate technique, and LO 42 may be any type of controllable oscillator amenable to such techniques. For example, frequency controller/compensator 43 may generate a digital control output or an analog control output, and therefore, LO 42 may be a digitally-controlled oscillator (DCO), voltage-controller oscillator (VCO), or any other oscillator that may be appropriately controlled by frequency controller/compensator 43. LO 42 and frequency controller/compensator 43 may, for example, form an analog or a digital phase-locked loop (PLL).

In one example of how the offset may be obtained, if the reference signal is assumed to be a pure tone, the received reference signal may be represented as A cos [$2\pi(f_{R\_DN}\pm\Delta f_T)t$] (the value may be plus or minus $\Delta f_T$ because either the upper or lower sideband resulting from frequency translation at the transponder may be transmitted on the downlink). Here, A is some amplitude, which may reflect amplification and/or attenuation and/or other operations/effects that may affect signal amplitude.

Given that the (expected) value of $f_{R\_DN}$ (in the case of no drift $\Delta f_T$) may be known, in one example, to which the invention is not limited, frequency controller/compensator 43 may identify the frequency offset, $\pm\Delta f_T$, by using a simple multiplication of the received reference signal by an expected received reference signal frequency ($f_{R\_DN}$) and performing a simple low-pass filtering operation. Note that, in this case, rather than deriving $f_{R\_DN}$ and forwarding its value, or an indication thereof, to frequency controller/compensator 43, receiver 44 may forward at least a portion of the received signal, that may contain A cos [$2\pi(f_{R\_DN}\pm\Delta f_T)t$], i.e., a portion of the signal containing the frequency-translated frequency reference signal, to frequency controller/compensator 43 (in another aspect of this disclosure, frequency controller/compensator 43 and receiver 44 may be integrated). In mathematical terms, the operations may involve performing $$A\cos[2\pi(f_{R\_DN}\pm\Delta f_T)t]\times\cos 2\pi f_{R\_DN}t =$$
$$\frac{A}{2}\{\cos 2\pi[2f_{R_{DN}}\pm\Delta f_T]t+\cos 2\pi(\pm\Delta f_T)t\}.$$

Figure 7:
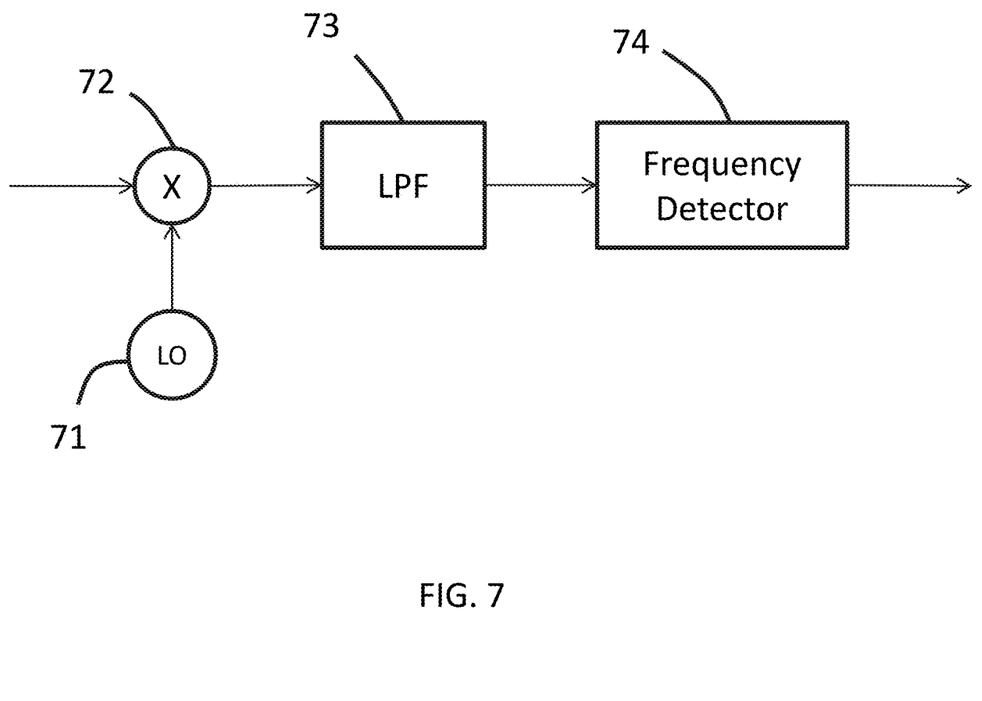
FIG. 7 shows an example of a conceptual block diagram of a portion of a system that may be used in conjunction with various aspects of the system, in accordance with an aspect of the disclosure.

FIG. 7 shows an example implementation of this, which, as noted above, may be included in the frequency controller/compensator 43 or in an integrated receiver 44/frequency controller/compensator 43. This may be performed by a multiplier 72 fed by a LO 71, which may be LO 42 or may be an independent LO, that generates a tone at a frequency of $f_{R\_DN}$. A low-pass filtering operation 73 may then be used to isolate the second term, which may be used to obtain the offset, $\pm\Delta f_T$, e.g., using one or more known methods for determining the frequency of a signal, in frequency detector 74. This value may, in turn, be used to control LO 42. That is, $f_{R\_UP}$ and/or other uplink frequencies may be compensated for the drift value of LO 23, prior to transmission, and the resulting downlink reference frequency may thus be "pre-compensated," i.e., $f_{R\_UP}$ may be adjusted so that, after frequency translation compensating for the offset, the downlink reference frequency is approximately at its nominal value, $f_{R\_DN}$. As such, receivers at stations other than station 14 may detect substantially no offset ("substantially" because the pre-compensation may not be perfect, and/or it may be possible for other conditions to affect frequency).

While this discussion has focused on the "pre-compensation" of the uplink reference signal frequency, the pre-compensation may generally be applied to the information-bearing signal and its center frequency, $f_c$, as well, in order to maintain the reference signal frequency and $f_c$ at a constant difference, $\Delta f$ (it is again noted that "$f_c$" may refer to more than one frequency, and any one or more of these frequencies may be pre-compensated, as may be convenient or appropriate). This may assist a station 15 in performing frequency acquisition, as will be discussed below.

Figure 6:
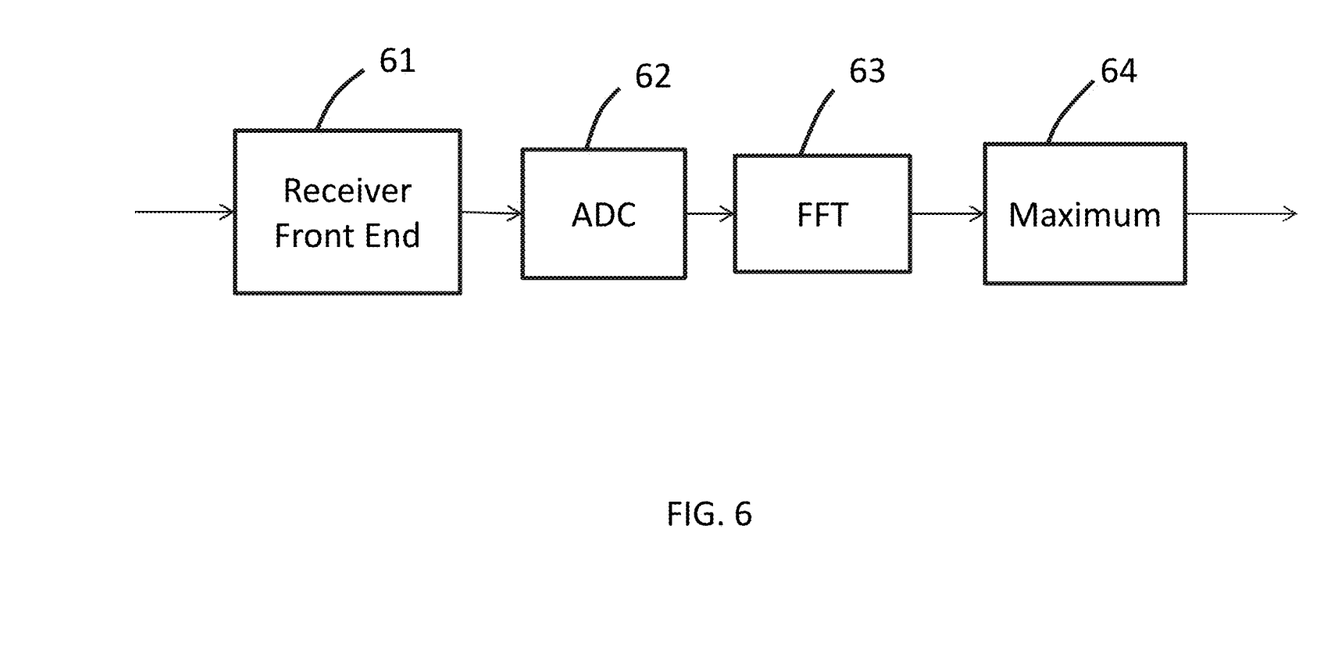
FIG. 6 shows an example of a conceptual block diagram of a portion of a system that may be used in conjunction with various aspects of the system, in accordance with an aspect of the disclosure.

While the above procedure for obtaining a frequency offset value may be used, a further example of a procedure and apparatus, according to another aspect of this disclosure, is shown in FIG. 6. A signal received at antenna 16, which, again, may include an information-bearing portion 31 and a reference signal 32, may be sent to a receiver front end 61 for front-end processing (which may include, e.g., filtering, amplification, down-conversion, etc., but which is not necessarily limited thereto). The output of the receiver front end 61 may be sampled and digitized in and analog-to-digital converter (ADC) 62. The resulting samples may be fed into a fast Fourier transform (FFT) or similar processing block 63. A "maximum" block 64 may then select the maximum value of the FFT 63 output, which may then identify the FFT frequency bin containing the reference signal. Given sufficient granularity, the frequency associated with the selected bin may then be compared with the expected frequency value to obtain an offset value, which may, in turn, be used by frequency controller/compensation 43 to control LO 42. The apparatus of FIG. 6 may be contained in receiver 44, or parts thereof may be contained in frequency controller/compensation 43.

While use of a FFT followed by maximum determination may be discussed above, the invention is not thus limited. In general, the FFT followed by maximum determination is an example, and other known methods of frequency estimation may be used, instead of or in conjunction with this technique.

Consequently, obtaining an indication of the frequency offset may be performed in the analog domain, the digital domain, or in a combination thereof.

Figure 8A:
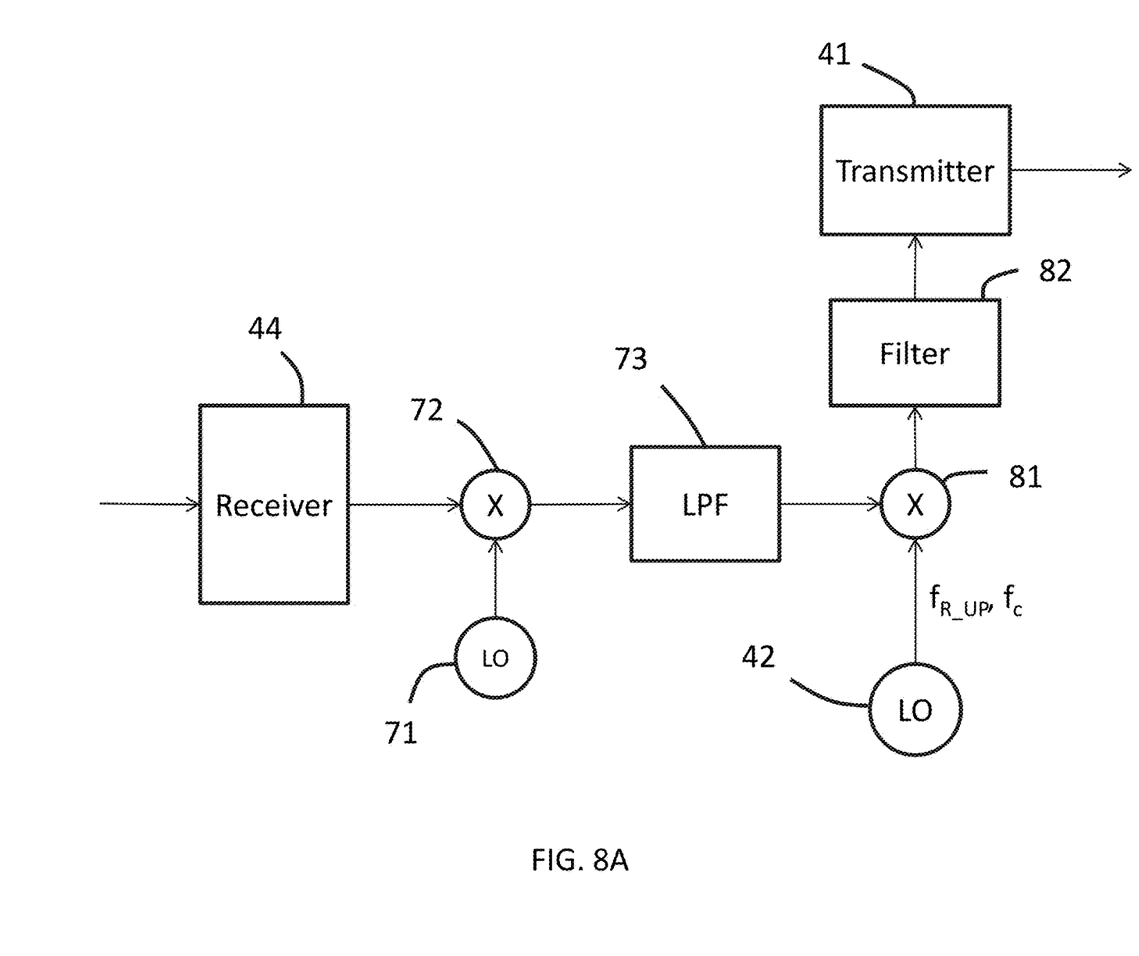
FIGS. 8A-8C show examples of conceptual block diagrams of systems according to various aspects of the disclosure.
Figures 8B, 8C:
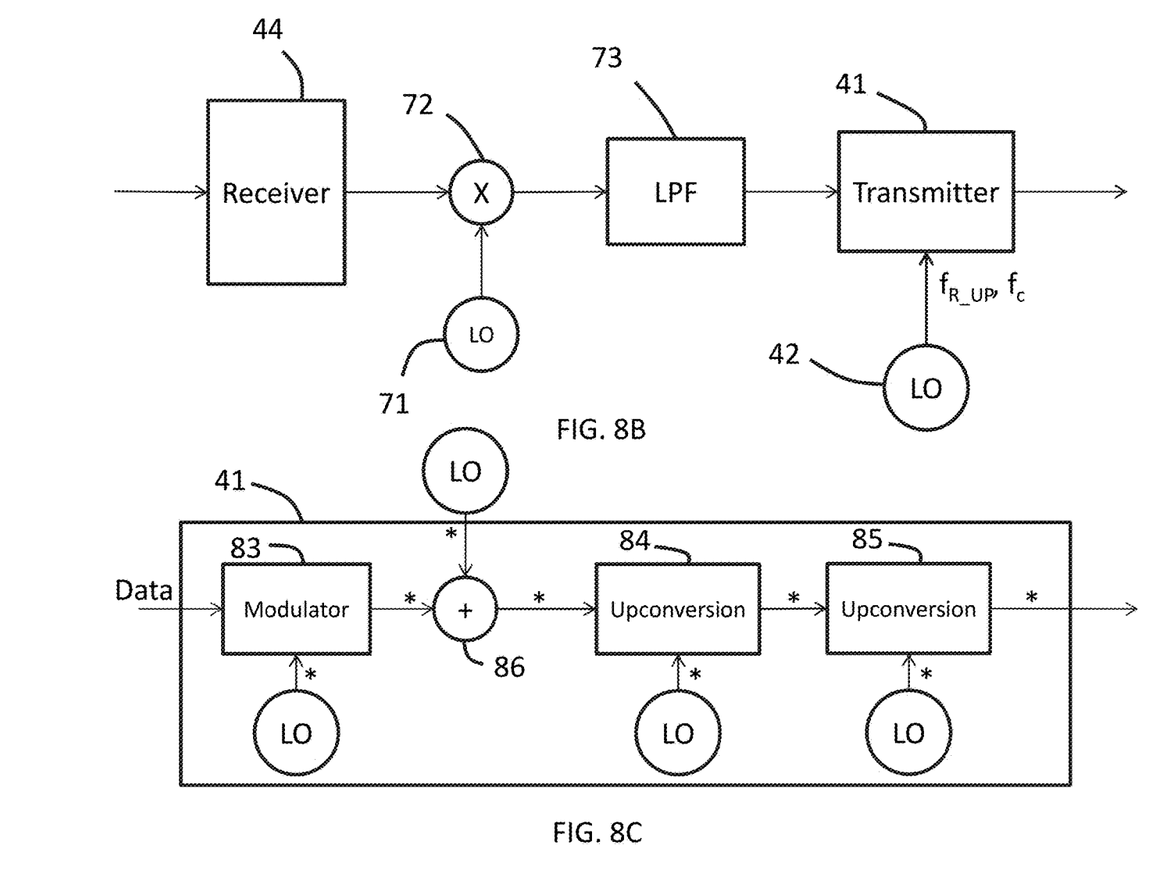

The above discussions may involve cases in which a frequency controller/compensator 43 may be used to control LO 42, there may be other techniques used for to compensate for transponder frequency drift. However, there may be further techniques for performing this compensation, as shown in FIGS. 8A-8C. FIGS. 8A-8C illustrate non-limiting examples that may use modified versions of the apparatus shown in FIG. 7, but without frequency detector 74. With the removal of frequency detector 74, the output of the apparatus of FIG. 7 may be a tone having a frequency of the frequency offset, $\pm \Delta f_T$. This tone may be output from filter 73. In the example of FIG. 8A, this tone may be used to multiply the tones generated by LO 42 at $f_{R\_UP}$ and $f_c$ (which may refer to multiple frequencies, as explained above, and the multiplication may affect only one of these frequencies), e.g., at multiplier 81. The results may be filtered 82; filter 82 may comprise one or more pass-bands, as may be appropriate to pass the compensated tones, which may then be fed to transmitter 41 for use in generating compensated signals for transmission.

The example of FIGS. 8B and 8C may generalize the example of FIG. 8A. As above, the output of filter 73 may be a tone having a frequency of the frequency offset. This may be fed directly into transmitter 41 and may be applied, as shown in FIG. 8C, at any of multiple points in the processes that may be implemented in transmitter 41. FIG. 8B shows and example of the generation of the tone output of filter 73 and the generation of two or more tones by LO 42 and their being fed to transmitter 41. FIG. 8C shows how these various tones may be applied in an example of transmitter 41. In general, data, which may be encoded, may be modulated 83 onto some frequency generated by a LO. In one sub-example, in which blocks 84 and 85 are omitted, this modulation 83 may be homodyne modulation, directly onto the desired center frequency, $f_c$, although the invention is not thus limited, and the modulation 83 may be onto some other modulation frequency. A frequency reference signal, e.g., a tone at a frequency of $f_{R\_UP}$, may be added to the modulated signal, e.g., using an adder 86. Asterisks in FIG. 8C show various points at which the compensation tone, output from filter 73, may be applied. In one example, the compensation tone may be applied either to the output of the LO feeding modulator 83 or to the output of modulator 83 and may also be applied to the frequency reference signal prior to adding it to the (compensated) modulated signal at adder 86. This involves two multiplication and filtering operations, one associated with application of the compensation tone at each of the two points (tone input to modulator 83 or output of modulator 83; and frequency reference signal). Alternatively, the compensation tone may be applied at any one of the other locations identified by asterisks in FIG. 8C, by means of multiplication and filtering. It may be simpler to apply the compensation tone to the individual signals, prior to addition, as this may reduce the filtering complexity; but application at a further point (e.g., prior to upconverter 84 or upconverter 85, at the output of upconverter 85, or to an LO output fed to upconverter 84 or upconverter 85) may result in a reduction in the number of multipliers and filters needed. Note that, although two upconversion stages 84 and 85 are shown, there may be zero or more upconversion stages.

Figure 5:
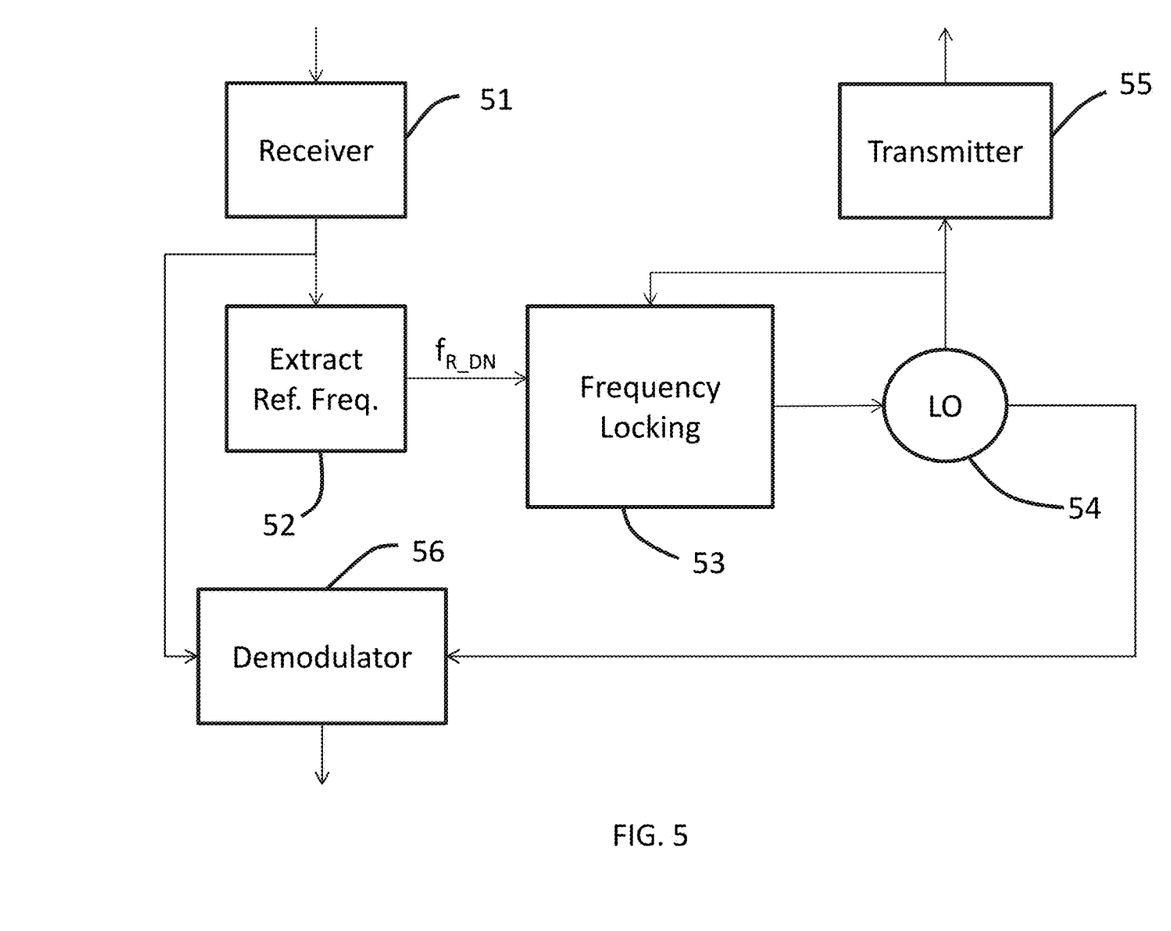
FIG. 5 shows an example of a conceptual block diagram of a further portion of a system, according to an aspect of the disclosure.

FIG. 5 shows an example of a conceptual block diagram of a system that may be included in station 15. Station 15 may include a receiver 51, which may include, e.g., a receiver front end 61, such as is shown in FIG. 6. The reference frequency, $f_{R\_DN}$, may be extracted 52. This may involve, for example, using the apparatus as shown in FIG. 6 and as described above, except that, given the "pre-compensation" for frequency drift in LO 23, in this case, the maximum FFT bin obtained by maximum block 64 may be used to identify the FFT bin corresponding to $f_{R\_DN}$. This (the bin or the value of $f_{R\_DN}$) may be provided to frequency locking 53. Frequency locking 53 may use $f_{R\_DN}$ and the knowledge of $\Delta f$ to obtain a value of approximately $f_c$, the center frequency of the information-bearing signal (it is approximate because the pre-compensation may not exactly compensate for the frequency offset of LO 23; also, again, $\Delta f$ may represent a separation between the reference frequency and some other predetermined frequency of the information-bearing signal, and although this discussion focuses on $f_c$, it is not limited thereto). Frequency locking 53 may include a PLL or other configuration (e.g., as discussed above) to control LO 54. LO 54 may generate one or more output frequency signals, e.g., substantially at $f_c$, that may used in transmitter 55, to transmit signals, and/or in demodulator 56, to demodulate received information-bearing signals.

It is further noted that, although described in conjunction with the pre-compensation scheme carried out by a station 14, the above techniques at station 15 and as described in conjunction with FIG. 5 may be used, in general, for compensating for frequency drift in a local oscillator of a station 15, based on a reference signal in a known band (e.g., a guard band) and at a known frequency separation from a frequency generated by the local oscillator (or having a known relationship thereto (e.g., but not limited to, a multiple or factor of the local oscillator frequency an edge frequency of a frequency band that is somehow related to the local oscillator frequency, etc.)).

Various operations described above may be performed by dedicated electronic hardware devices, or alternatively, may be implemented using other hardware, software, or firmware, or combinations thereof, including the possibility of using a processor that may execute software instructions, which may, e.g., be saved on a storage device, and which may cause the operations to be implemented.

Various aspects of the disclosure have been presented above. However, the invention is not intended to be limited to the specific aspects presented above, which have been presented for purposes of illustration. Rather, the invention extends to functional equivalents as would be within the scope of the appended claims. Those skilled in the art, having the benefit of the teachings of this specification, may make numerous modifications without departing from the scope and spirit of the invention in its various aspects.

What is claimed is:

1. A method of frequency drift compensation in a communication system, the method including:
  receiving, at a communication apparatus, a frequency-translated downlink version of an uplink frequency reference signal originally transmitted by the communication apparatus to a frequency-translating signal repeating apparatus;
  determining, at the communication apparatus, a frequency drift of the frequency-translated downlink version of the frequency reference signal, relative to an expected frequency of the frequency-translated downlink version of the frequency reference signal; and
  using, by the communication apparatus, the frequency drift to compensate one or more frequencies of uplink signals transmitted by the communication apparatus such that another receiver receiving frequency-translated downlink versions of the uplink signals transmitted by the communication apparatus detects substantially no frequency drift.

2. The method of claim 1, wherein the frequency reference signal is a single tone.

3. The method of claim 1, wherein the frequency reference signal is transmitted in an unused frequency band.

4. The method of claim 3, wherein the unused frequency band is a guard band.

5. The method of claim 1, wherein said using the offset includes employing a phase-locked loop to adjust one or more local oscillators configured to generate the one or more frequencies.

6. The method of claim 1, wherein determining the frequency drift comprises:
  multiplying the received downlink version of the uplink frequency reference signal by a tone having a frequency equal to the expected frequency; and
  filtering a result of said multiplying to obtain a filtered signal having a frequency based on the frequency drift and not based on the expected frequency.

7. The method of claim 6, wherein determining the frequency drift further comprises detecting a frequency of the filtered signal.

8. The method of claim 6, wherein using the frequency drift comprises using the filtered signal to multiply one or more signals used to generate the uplink signals transmitted by the communication apparatus.

9. The method of claim 1, wherein said determining the frequency drift comprises:
  performing a fast Fourier transform based on the frequency-translated downlink version of the uplink frequency reference signal or a received downlink signal including the frequency-translated downlink version of the uplink frequency reference signal;
  identifying a frequency bin containing the frequency-translated downlink version of the uplink frequency reference signal; and
  obtaining the frequency drift as a difference between a frequency associated with the frequency bin containing the frequency-translated downlink version of the uplink frequency reference signal and the expected frequency.

10. A communication apparatus including:
  a transmitter;
  a receiver; and
  a frequency controller,
  wherein the transmitter, the receiver and the frequency controller are co-located, and
  wherein the receiver and the frequency controller are configured to receive and analyze a downlink version of an uplink frequency reference signal transmitted by the transmitter through a frequency-translating signal repeating apparatus, to obtain a frequency drift value relative to an expected frequency value of the frequency-translated downlink version of the uplink frequency reference signal, wherein the frequency drift is introduced by the frequency-translating signal repeating apparatus, and to use the frequency drift value to control a frequency used in the transmitter to transmit one or more further signals, to compensate for the frequency drift value such that another receiver of a different communication apparatus detects substantially no frequency drift in a downlink signal received by the other receiver from the transmitter, via the frequency-translating signal repeating apparatus.

11. The communication apparatus of claim 10, further including one or more local oscillators coupled to provide one or more frequencies to the transmitter and coupled to be controlled by the frequency controller.

12. The communication apparatus of claim 11, wherein the frequency controller and at least one of the one or more local oscillators is configured as a phase-locked loop.

13. The communication apparatus of claim 10, wherein the receiver, the frequency controller, or a combination of the receiver and the frequency controller includes:
  at least one fast Fourier transformer (FFT); and
  at least one maximum selector coupled to the at least one FFT;
  wherein the at least one FFT and the at least one maximum selector are configured to determine a frequency value of the frequency-translated downlink version of the uplink frequency reference signal.

14. The communication apparatus of claim 13, wherein the receiver, the frequency controller, or the combination of the receiver and the frequency controller is configured to obtain the frequency drift value by obtaining a difference between the frequency value of the frequency-translated downlink version of the uplink frequency reference signal and the expected frequency value.

15. The communication apparatus of claim 10, wherein the frequency controller or the combination of the receiver and the frequency controller includes:
  a multiplier configured to multiply a signal containing the frequency-translated downlink version of the uplink frequency reference signal by a local signal generated at the expected frequency value; and
  a low-pass filter coupled to receive an output of the multiplier.

16. The communication apparatus of claim 15, wherein the frequency controller or the combination of the receiver and the frequency controller further includes a frequency detector coupled to an output of the low-pass filter.

17. The communication apparatus of claim 15, further comprising:
  one or more multipliers coupled to receive an output of the low-pass filter; and
  one or more filters coupled to filter one or more outputs of the one or more multipliers;
  wherein the one or more multipliers and the one or more filters are configured to compensate one or more signals used to generate the further signals.

18. The communication apparatus of claim 17, wherein at least one of the one or more multipliers and at least one of the one or more filters are disposed within the transmitter.

19. A processor-accessible storage device containing executable instructions configured to result in the implementation of operations at a communication apparatus, the operations including:
  determining a frequency drift of a frequency-translated downlink version of a frequency reference signal received at the communication apparatus and originally transmitted by the communication apparatus on an uplink to a frequency-translating repeating apparatus, relative to an expected frequency of the frequency-translated downlink version of the frequency reference signal; and
  using the frequency drift to compensate one or more frequencies of uplink signals transmitted by the communication apparatus such that another receiver receiving frequency-translated downlink versions of the uplink signals transmitted by the communication apparatus detects substantially no frequency drift.

20. The storage device of claim 19, wherein the frequency reference signal is a single tone.

21. The storage device of claim 19, wherein the frequency reference signal is transmitted in an unused frequency band.

22. The storage device of claim 21, wherein the unused frequency band is a guard band.

23. The storage device of claim 19, wherein determining the frequency drift comprises:
  multiplying the received frequency reference signal by a tone having a frequency equal to the expected frequency; and
  filtering a result of said multiplying to obtain a filtered signal having a frequency based on the frequency drift and not based on the expected frequency.

24. The storage device of claim 23, wherein determining the frequency drift further comprises detecting a frequency of the filtered signal.

25. The storage device of claim 23, wherein using the frequency drift comprises using the filtered signal to multiply one or more signals used to generate the uplink signals transmitted by the communication apparatus.

26. The storage device of claim 19, wherein said determining the frequency drift comprises:
  performing a fast Fourier transform based on the frequency-translated downlink version of the uplink frequency reference signal or a received signal including the frequency-translated downlink version of the uplink frequency reference signal;
  identifying a frequency bin containing the frequency-translated downlink version of the uplink frequency reference signal; and
  obtaining the frequency drift as a difference between a frequency associated with the frequency bin containing the frequency-translated downlink version of the uplink frequency reference signal and the expected frequency.

27. A communication apparatus including:
  at least one processing device; and
  the storage device of claim 19, wherein the at least one processing device is coupled to the storage device and is configured to execute the executable instructions.

* * * * *